US007000891B2

(12) United States Patent
Rocca et al.

(10) Patent No.: US 7,000,891 B2
(45) Date of Patent: Feb. 21, 2006

(54) SCREW-IN VALVE (75) Inventors: Wolfgang Rocca, Stutensee (DE); Frantisek Vesely, Horni Marsov (CZ)

(73) Assignee: FSP-Holding AG, Baar (CH)

( * ) Notice: Subject to any disclaimer, the term of this patent is extended or adjusted under 35 U.S.C. 154(b) by 36 days.

(21) Appl. No.: 11/009,320

(22) Filed: Dec. 9, 2004

(65) Prior Publication Data
US 2005/0139275 A1 Jun. 30, 2005

Related U.S. Application Data (63) Continuation of application No. PCT/EP02/06418, filed on Jun. 12, 2002.

(51) Int. Cl.
F16K 31/02 (2006.01)

(52) U.S. Cl. ............... 251/129.01; 251/129.15; 137/15.21; 137/454.5; 137/625.65

(58) Field of Classification Search ........... 251/129.01, 251/129.15, 129.19; 137/15.17, 15.21, 315.09, 137/454.5, 625.65
See application file for complete search history.

(56) References Cited

U.S. PATENT DOCUMENTS

| 3,893,484 | A | 7/1975 | Greene |
| 3,906,980 | A | 9/1975 | Hanser et al. |
| 4,577,831 | A | 3/1986 | DiBartolo |
| 4,630,640 | A | 12/1986 | DiBartolo |
| 4,714,293 | A | 12/1987 | Watson |
| 4,742,846 | A | 5/1988 | DiBartolo |
| 4,795,129 | A | 1/1989 | Clark |
| 4,834,135 | A | 5/1989 | DiBartolo |
| 5,381,823 | A | 1/1995 | DiBartolo |
| 5,520,217 | A | 5/1996 | Grawunde |
| 5,550,976 | A | 8/1996 | Henderson et al. |
| 5,901,749 | A | 5/1999 | Watson |
| 6,039,070 | A | 3/2000 | Zaehe |
| 6,092,784 | A * | 7/2000 | Kalfsbeck ............... 251/129.15 |
| 6,119,722 | A | 9/2000 | Zaehe |
| 6,182,697 | B1 | 2/2001 | Parker et al. |
| 6,408,883 | B1 * | 6/2002 | Motoki et al. ......... 137/625.64 |
| 6,886,802 | B1 * | 5/2005 | Bartolacelli et al. ... 251/129.19 |
| 2002/0043287 | A1 | 4/2002 | Beyrak |

FOREIGN PATENT DOCUMENTS

| AU | 397 135 | 2/1994 |
| DE | 44 23 627 | 1/1996 |
| EP | 1 001 197 | 5/2000 |

OTHER PUBLICATIONS

*Patent Abstracts of Japan*, "Pilot Operating Pressure Valve," Publication No. 2000146015, May 26, 2000.

* cited by examiner

*Primary Examiner*—Edward K. Look
*Assistant Examiner*—John K. Fristoe, Jr.
(74) *Attorney, Agent, or Firm*—Lipsitz & McAllister, LLC (57) ABSTRACT

The invention relates to a screw-in valve comprising a screw-in component, a sleeve with at least two connection openings to which a pressure load can be alternately applied, and a valve piston held for axial displacement in the sleeve for opening and closing a flow connection between the connection openings. In order to further develop the screw-in valve so as to reduce the risk of impairing movement of the valve piston on account of misalignment of the screw-in component, it is proposed, in accordance with the invention, that the sleeve be mounted so as to be axially immovable but displaceable and/or pivotable perpendicularly to the screw-in direction of the screw-in component relative to the screw-in component.

15 Claims, 12 Drawing Sheets

FIG.12

SCREW-IN VALVE

This application is a continuation of international application number PCT/EP02/06418 filed on Jun. 12, 2002.

The present disclosure relates to the subject matter disclosed in international application PCT/EP02/06418 of Jun. 12, 2002, which is incorporated herein by reference in its entirety and for all purposes.

BACKGROUND OF THE INVENTION

The invention relates to a screw-in valve comprising a screw-in component, a sleeve with at least two connection openings to which a pressure load can be alternately applied, and a valve piston held for axial displacement in the sleeve for opening and closing a flow connection between the connection openings.

Such screw-in valves are known in various configurations, for example, in the form of directional control valves, check valves or overload valves. The valves can be controlled by hand or by an external force, for example, by means of an electromagnet.

The screw-in valve can be screwed by means of a screw-in component into a housing, for example, a control block, and by axial displacement of the valve piston, i.e., in the longitudinal direction of the sleeve, a flow connection can be selectively opened or closed between two connection openings of the sleeve for a pressure fluid, for example, a hydraulic fluid or compressed air. The axially movable piston is guided in the sleeve with very little play in order to keep leakage of the screw-in valve as low as possible. It has been found that movability of the piston may be impaired by a misalignment of the screw-in component occurring when screwing it into the housing accommodating the screw-in valve. Such a misalignment or canting of the screw-in component cannot always be excluded, as such screw-in valves are often screwed in within a short time under rough ambient conditions by people who are untrained.

The object of the present invention is to further develop a screw-in valve of the kind mentioned at the outset in such a way that the danger of impairing the movement of the valve piston when screwing in the screw-in component is reduced.

SUMMARY OF THE INVENTION

This object is accomplished, in accordance with the invention, with a screw-in valve of the generic kind in that the sleeve is mounted so as to be axially immovable but displaceable and/or pivotable perpendicularly to the screw-in direction of the screw-in component relative to the screw-in component.

The invention incorporates the concept that an impairment of the movement of the valve piston in the event of misalignment or canting of the screw-in component can be reduced by the sleeve being mounted so as to be displaceable and/or pivotable perpendicularly to the screw-in direction. Thus, if the screw-in component is canted when being screwed into a corresponding housing, the resulting misalignment of the screw-in component can be compensated by a kind of "countermovement" of the sleeve, namely a tilting, pivoting or displacement perpendicular to its longitudinal axis, i.e., by means of radial tolerance compensation.

The invention also embodies the concept that by means of axially immovable mounting of the sleeve it can be ensured that during use of the screw-in valve it is not necessary for the sleeve, in the screwed-in state of the screw-in valve, to be supported on a support surface of the housing accommodating the screw-in valve. Rather, such a support surface can be dispensed with, but the capability of the sleeve to be alternately subjected to pressure load, i.e., the capability of the sleeve to be subjected to axial pressure load in both the direction towards the screw-in component and the direction away from the screw-in component, is maintained. This generally enables a considerably simplified assembly of the screw-in valve, for even in the event of a misalignment or a canting of the screw-in component, the movability of the valve piston is not impaired. Furthermore, there is no need to ensure that the screw-in component is screwed far enough into a housing accommodating the screw-in valve that the sleeve comes to rest against a corresponding support surface of the housing and is therefore supported in axial direction. Consequently, assembly of the screw-in valve can even be carried out by untrained personnel under time pressure.

In a preferred embodiment of the inventive screw-in valve, the sleeve is connected to the screw-in component by at least one positive connection. It has been found that a mounting of the sleeve which can be alternately subjected to pressure load can be cost-effectively ensured by means of a positive connection, with the sleeve being displaceable and/or pivotable perpendicularly to the screw-in direction of the screw-in component. Consequently, the sleeve can carry out a tilting, wobbling or displacement without its axial position relative to the screw-in component undergoing any change.

It is preferable for the sleeve to be directly positively connected to the screw-in component.

For example, provision may be made for the sleeve to be connected to the screw-in component by means of a flange. In this case, a flange is to be understood as a deformation of the screw-in component and/or of the sleeve transversely to the longitudinal axis of the sleeve, i.e., a widening or narrowing, with a positive connection between sleeve and screw-in component being achieved by the deformation.

Alternatively and/or supplementarily, provision may be made for the sleeve to be positively connected to the screw-in component by means of a retaining ring or snap ring connection. For example, provision may be made for the screw-in component to form a receptacle in which a section of the sleeve is held with play by means of a retaining ring or a snap ring. By making sure that there is play between the section of the sleeve and the receptacle of the screw-in component, it can be ensured in a constructionally simple manner that the sleeve can be displaced and/or pivoted perpendicularly to the screw-in direction of the screw-in component. By means of the retaining ring or snap ring it is, at the same time, ensured that the sleeve which is capable of being subjected to pressure load in two opposed directions can be axially immovably mounted on the screw-in component.

It is of advantage for the sleeve to be connected to the screw-in component by at least one intermediate component. In many cases, assembly of the screw-in valve can thereby be simplified.

For example, provision may be made for the sleeve to be secured on the intermediate component, and for the intermediate component to be positively connected to the screw-in component and to be mounted so as to be axially immovable but displaceable and/or pivotable perpendicularly to the screw-in direction of the screw-in component relative to the screw-in component.

The sleeve can be secured to the intermediate component by, for example, the sleeve being screwed to the intermediate component.

In a preferred embodiment of the invention, the intermediate component is connected to the screw-in component by means of a flange. For this purpose, provision may, for example, be made for the intermediate component to dip into a receptacle of the screw-in component, and for the screw-in component to be deformed at the level of the receptacle, after introduction of the intermediate component, transversely to the direction of introduction, and for a positive connection to thereby be made between screw-in component and intermediate component. Alternatively and/or supplementarily, provision may be made for an end section of the intermediate component dipping into the receptacle of the screw-in component to be radially outwardly deformed and to thereby dip into a receiving groove of the screw-in component receiving the widened area of the end section. By means of the flange it is ensured that the intermediate component can be displaced and/or pivoted perpendicularly to the screw-in direction of the screw-in component, so that in the event of canting of the screw-in component, a compensatory movement of the intermediate component and the sleeve secured thereto is possible, so as to prevent impairment of the movement of the valve piston.

As explained above, the inventive screw-in valve is characterized, inter alia, by the sleeve being mounted so as to be axially immovable relative to the screw-in component. Such a mounting can be ensured in a constructionally particularly simple manner by the sleeve being releasably connectable, for example, screwable, to the intermediate component, and by the screw-in component forming a stop on which the intermediate component is axially immovably held.

In a particularly preferred embodiment of the inventive screw-in valve, the sleeve is held on the intermediate component so as to be axially immovable but displaceable and/or pivotable perpendicularly to the screw-in direction of the screw-in component, and the intermediate component is held on the screw-in component so as to be axially immovable but displaceable and/or pivotable perpendicularly to the screw-in direction of the screw-in component. In the event of canting of the screw-in component, this makes it possible to compensate its misalignment both by a pivoting or displacement of the intermediate component relative to the screw-in component and by a pivoting or displacement of the sleeve relative to the intermediate component. Thus, only comparatively small relative movements between sleeve and intermediate component and between intermediate component and screw-in component are required to ensure that in the event of misalignment of the screw-in component, impairment of the movement of the valve piston is prevented.

It is expedient for the intermediate component to comprise an axial bore in which an end area of the sleeve is held with radial play by means of a snap ring or a retaining ring. The end area of the sleeve is alignable at an incline to the longitudinal axis of the axial bore of the intermediate component as the end area of the sleeve is received with radial play by the axial bore. The snap ring or retaining ring ensures that movement of the sleeve in axial direction, i.e., in the longitudinal direction of the sleeve, is prevented.

As explained above, the screw-in valve can be manually operable or by external force.

Provision is made in a preferred embodiment for the screw-in valve to be electromagnetically actuatable. For this purpose, the screw-in valve preferably comprises an electromagnetic actuating unit with an electromagnet surrounding a pole tube, with the pole tube forming the above-explained intermediate component which is connected to the sleeve. In such an embodiment, the sleeve is held on the pole tube, and the pole tube is mechanically connected to the screw-in component.

Provision may be made for the pole tube to be integrally joined to the screw-in component. This enables an embodiment of the inventive screw-in valve, which can be manufactured particularly cost-effectively.

Alternatively, provision may be made for the pole tube to be releasably connectable, for example, screwable, to the screw-in component.

For the electromagnetic actuation, the screw-in valve preferably comprises an electromagnetic actuating unit which is displaceable and/or pivotable perpendicularly to the screw-in direction of the screw-in component.

Impairment of the actuation of the screw-in valve in the event of the screw-in component canting or becoming jammed or misaligned in any other way can thereby be prevented. For example, provision may be made for the electromagnetic actuating unit to comprise a pole tube on which an electromagnet is held, with the pole tube being positively connected to the screw-in component and displaceable and/or pivotable at an incline or perpendicularly to the screw-in direction of the screw-in component. The pole tube usually receives a magnet armature which, upon excitation of the electromagnet, is movable in axial direction to actuate the valve piston. The pole tube forms a guide for the magnet armature, in which the magnet armature is slidingly mounted. In the event of the screw-in component canting or getting stuck, the pole tube can be displaced and/or pivoted perpendicularly to the screw-in direction, so that the movement of the magnet armature guided in the pole tube is not impaired by a canting or any other misalignment of the screw-in component.

The following description of preferred embodiments serves in conjunction with the drawings to explain the invention in greater detail.

DETAILED DESCRIPTION OF THE INVENTION

Figure 1:
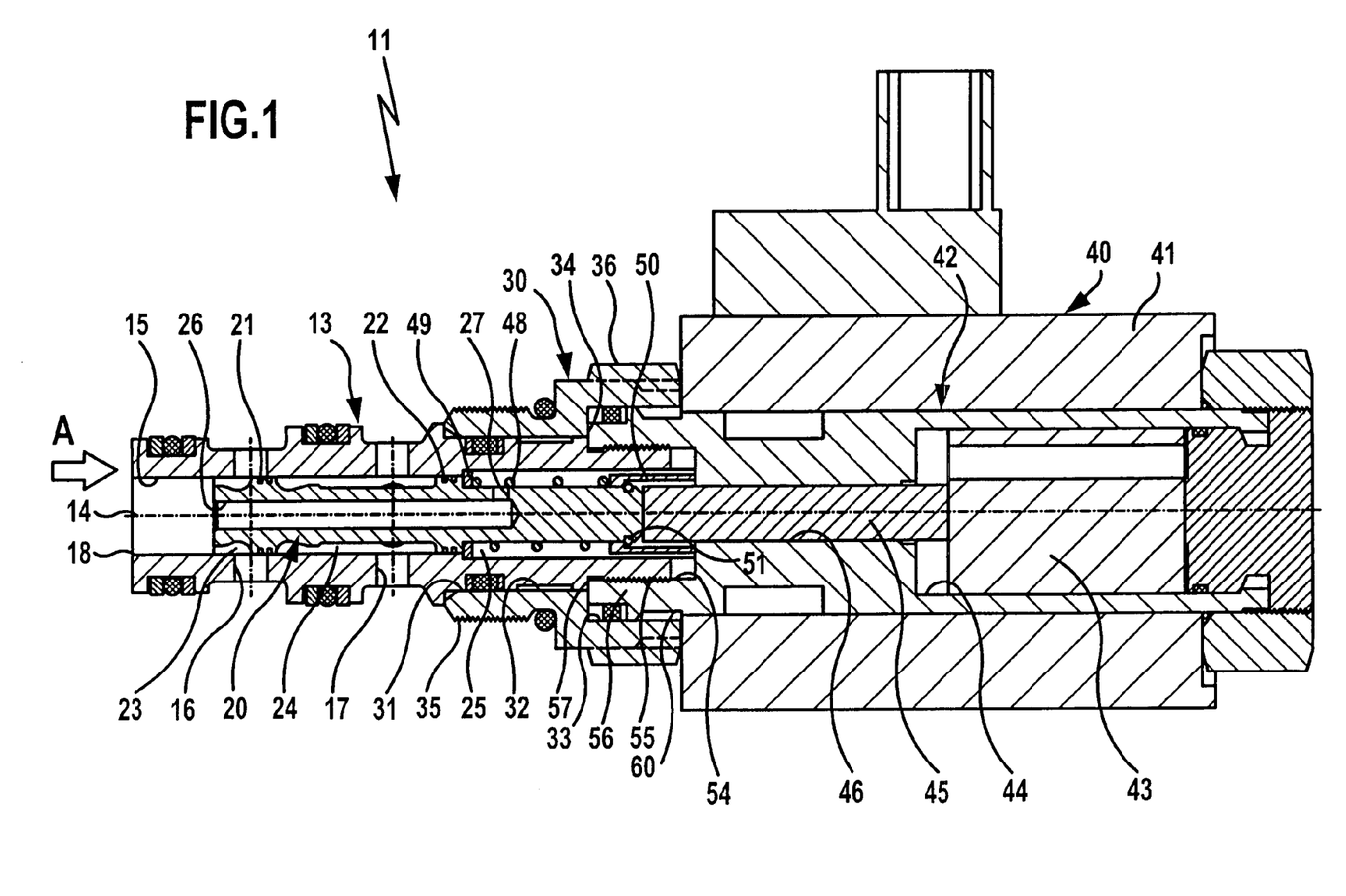
FIG. 1 shows a sectional view of a first embodiment of an inventive screw-in valve.
Figure 2:
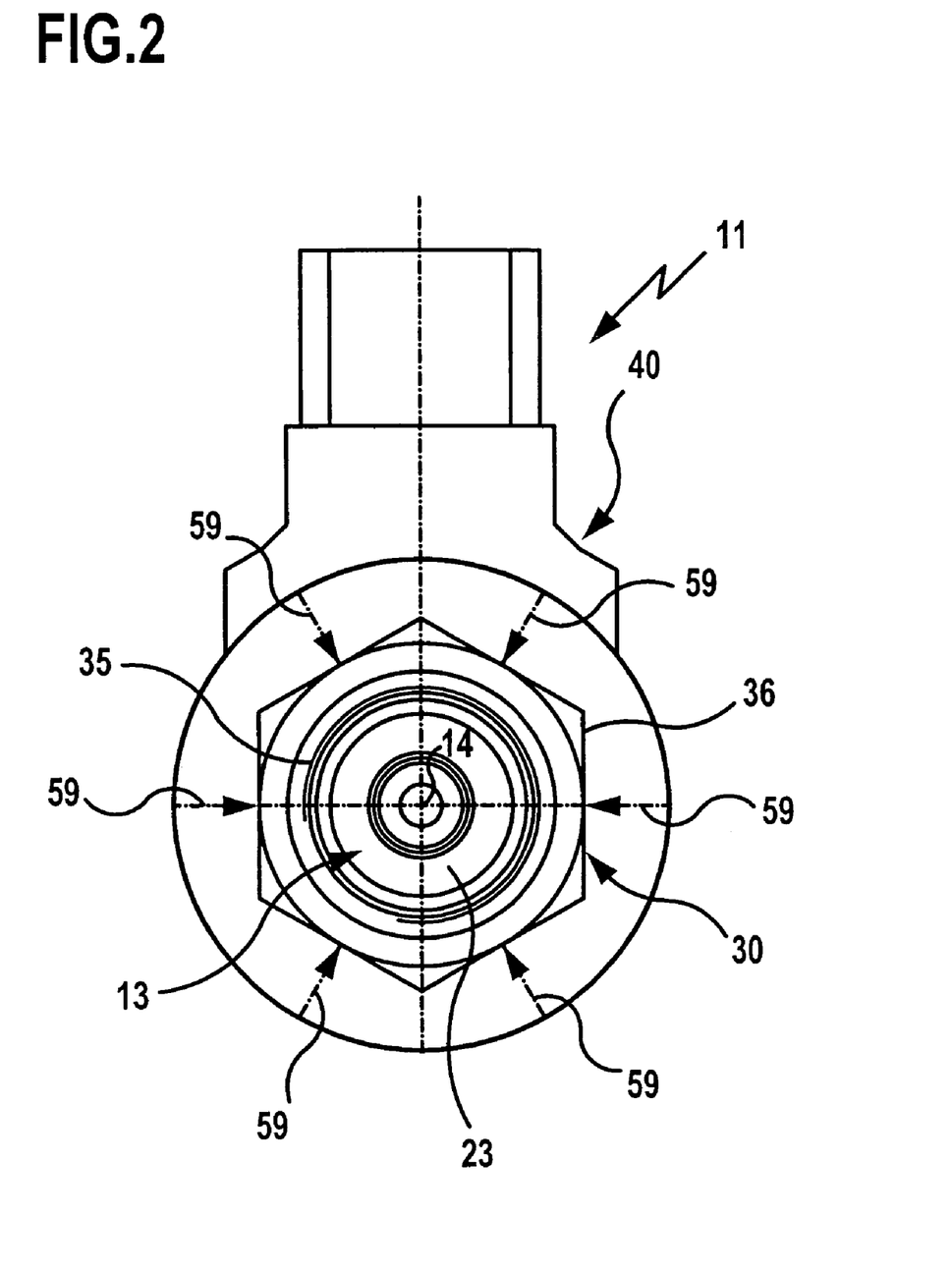
FIG. 2 shows a side view in the direction of arrow A from FIG. 1.

FIGS. 1 and 2 show in schematic representation a first embodiment of an inventive screw-in valve which is generally designated by reference numeral 11. It is constructed as a 3/2-port directional control valve and comprises a sleeve 13 with a longitudinal bore 15 oriented coaxially with the longitudinal axis 14 of the sleeve 13 and with two parallel transverse bores 16 and 17 arranged in spaced relationship to each other with respect to the longitudinal axis 14. The longitudinal bore 15 defines at the end face a first connection opening 18 of the sleeve 13, and the transverse bores 16 and 17 define in the circumferential area of the sleeve 13 second and third connection openings.

A valve piston 20 is held for axial displacement, i.e., in the direction of the longitudinal axis 14, in the longitudinal bore 15 of the sleeve 13. The valve piston 20 is guided inside the longitudinal bore 15 by means of two guide seals 21 and 22 arranged in axially spaced relationship to each other, which are fitted into the longitudinal bore 15 and each comprise a sealing ring which bears in a fluid-tight manner on the wall of the longitudinal bore 15. Between the outer side of the valve piston 20 and the wall of the longitudinal bore 15 there are three ring-shaped spaces in the form of a front flow space 23 in the area between the first guide seal 21 and the front end of the valve piston 20 facing the first connection opening 18, a rear flow space 24 at a level between the two guide seals 21 and 22, and a spring space 25 between the second guide seal 22 and the rear end of the valve piston 20 facing away from the first connection opening 18.

The valve piston 20 comprises in coaxial alignment with the longitudinal axis 14 a blind bore 26 which opens into the front end face of the valve piston 20 facing the first connection opening 18 of the sleeve 13. From the end area of the blind bore 26 facing away from the first connection opening 18 there branches off a transverse bore 27, so that the first connection opening 18 is in pressure connection with the spring space 25 via the blind bore 26 and the transverse bore 27.

The screw-in valve 11 can be screwed into a housing, which is known per se and, therefore, not shown in the drawings, for example, into the housing of an hydraulic control block. For this purpose, the screw-in valve 11 comprises a screw-in component 30 with a stepped through-bore 31 comprising a front bore section 32 facing the first connection opening 18 of the sleeve 13 and a rear bore section 33 facing away from the first connection opening 18, which are connected to each other via a radially extending step 34. The screw-in component 30 carries at the level of the front bore section 32 an external thread 35, and at the level of the rear bore section 33 the screw-in component 30 is configured on the outside as a hexagon 36.

The screw-in valve 11 is electromagnetically actuatable. An electromagnetic actuating unit 40 with an electromagnet 41, which surrounds a pole tube 42 in circumferential direction, is used therefor. The pole tube 42 accommodates a magnet armature 43, which is held in a cylindrical receptacle 44 of the pole tube 42 for displacement parallel to the longitudinal axis 14 of the sleeve 13 and is displaceable in the direction towards the valve piston 20 by excitation of the electromagnet.

Secured to the magnet armature 43 is a tappet 45 which passes through a through-bore 46 of the pole tube 42 and bears with its free end on the rear end face of the valve piston 20 facing away from the connection opening 18.

The valve piston 20 is surrounded in the area of the spring space 25 by a helical return spring 48 which is clamped between a support disc 49 and a support body 50. The support disc 49 is supported in axial direction on a radial widening of the longitudinal bore 15, and the support body 50 is held immovably in axial direction on the valve piston 20 by means of a retaining ring 51.

When the electromagnet 41 is excited, the magnet armature 43 is displaced and thereby exerts an actuating force on the valve piston 20 via the tappet 45, so that the valve piston 20 is displaced against the return force of the return spring 48 from its rear position shown in FIG. 1 so far forwards that the first guide seal 21 in the area between the first connection opening 18 and the front transverse bore 16 lies tight against the wall of the longitudinal bore 15. This results in the flow connection between the first connection opening 18 and the front transverse bore 16 via the front flow space 23 being closed, while, at the same time, the flow connection between the front transverse bore 16 and the rear transverse bore 17 via the rear flow space 24 is opened. When the electromagnet 41 is not excited, the magnet armature 43 no longer exerts any actuating force, and the valve piston 20 is returned to its rear position shown in FIG. 1 under the action of the return spring 48, with the first guide seal 21 closing the flow connection between the two transverse bores 16 and 17 and instead opening the flow connection between the first connection opening 18 and the front transverse bore 16.

To ensure that the displacement of the valve piston 20 is not impaired by the screw-in component 30 canting or becoming jammed or misaligned in any other way when being screwed into an associated housing, the sleeve 13, in which the valve piston 20 is guided, is mounted such that it is displaceable and/or pivotable perpendicularly to the screw-in direction of the screw-in component 30, but is held immovably in axial direction in relation to the screw-in component 30. For this purpose, in the first embodiment of the invention shown in FIGS. 1 and 2 the sleeve 13 passes through the screw-in component 30 and dips with its rear end facing away from the first connection opening 18 into a receptacle 54 of the pole tube 42 and is screwed in this area to the pole tube 42 via a thread 55. The pole tube 42, in turn, forms at the level of the thread 55 a pole tube sleeve 56 which dips so far into the rear bore section 33 of the through-bore 31 of the screw-in component 30 that a clearance, for example, a spacing of approximately 0.1 mm results between the step 34 and the end face 57 of the pole tube sleeve 56 facing the connection opening 18.

At the level of the rear bore section 33 the pole tube sleeve 56 is positively connected via a flange to the screw-in component 30. For this purpose, the screw-in component 30 is bent radially inwardly in the area of the hexagon 36, as indicated by arrows 59 in FIG. 2. After the bending, the screw-in component 30 engages at the level of the hexagon 36 a ring groove 60 which surrounds the pole tube sleeve 56 in circumferential direction. With a view to improved clarity, the screw-in valve 11 is shown in FIG. 1 in the state prior to producing the flange.

By way of the flange of the screw-in component 30 it is ensured that the screw-in component 30 is positively connected to the pole tube 42 which, in turn, is screwed to the sleeve 13. The flange connection makes it possible to align the pole tube 42 at an incline to the screw-in component 30, i.e., to pivot it about a pivot axis aligned perpendicularly to the screw-in direction. The sleeve 13 screwed to the pole tube 42 passes through the front bore section 32 of the screw-in component 30 with radial play, so that the sleeve 13 can be aligned together with the pole tube 42 at an incline to the screw-in component 30, i.e., a wobbling or pivoting movement can occur to compensate a misalignment of the screw-in component 30, and owing to the screw connection between pole tube 42 and sleeve 13 it is ensured that the sleeve 13 is unable to carry out any axial movement even under alternating pressure load.

Alternative embodiments of the inventive screw-in valve are shown in FIGS. 3 to 12, and identical components or components which act in the same way bear the same reference numerals as in FIG. 1. In this regard, in order to avoid repetitions, reference is made in full to the above explanations.

Figure 3:
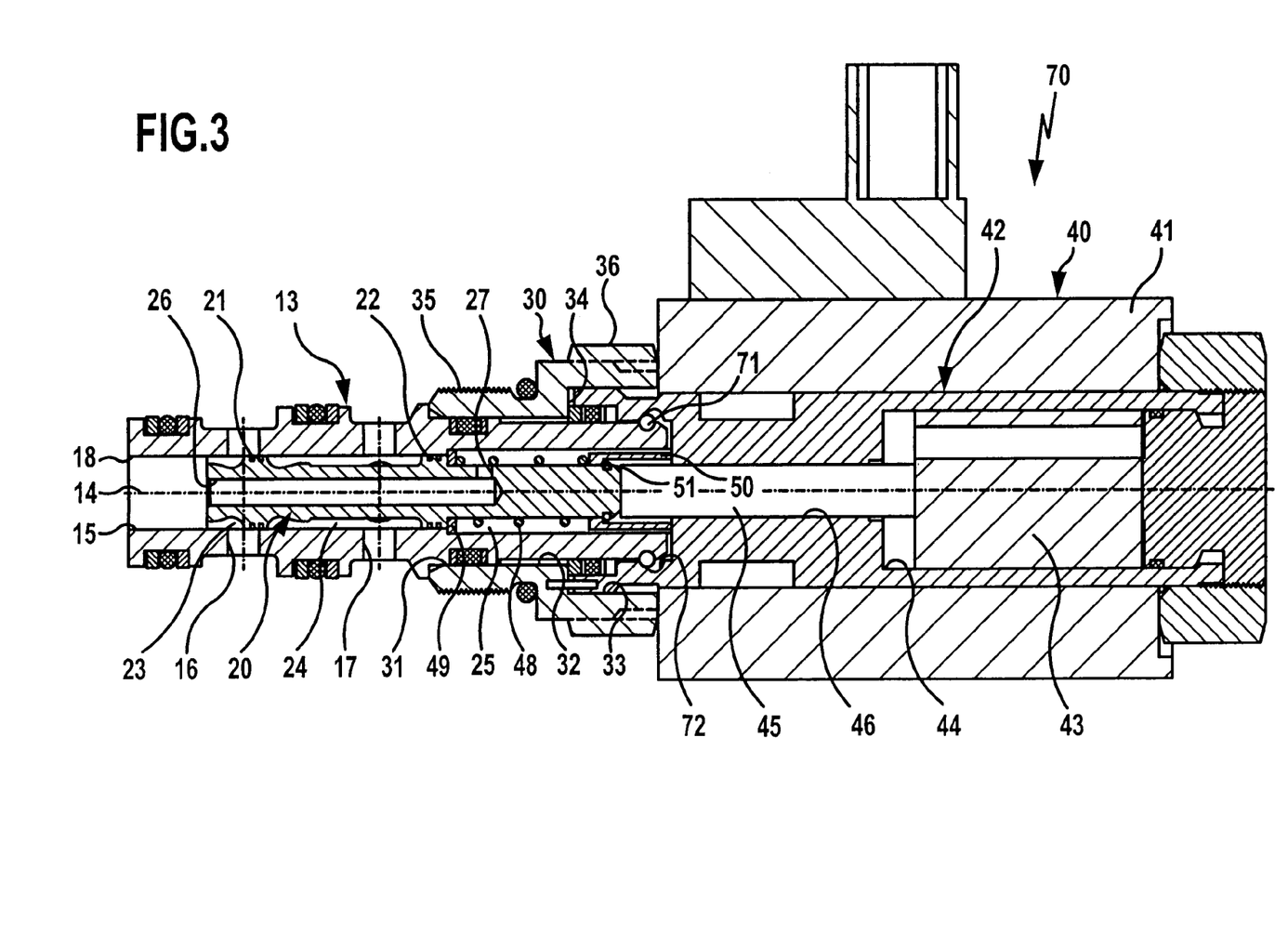
FIG. 3 shows a sectional view of a second embodiment of an inventive screw-in valve.

FIG. 3 shows a screw-in valve in the form of a 3/2-port directional control valve, generally designated by reference numeral 70, which differs from the above-explained screw-in valve 11 in that the sleeve 13 is not screwed to the pole tube 42, but instead a snap ring connection is provided between the sleeve 13 and the pole tube sleeve 56. For this purpose, the sleeve 13 in the embodiment shown in FIG. 3 carries in its end area facing away from the first connection opening 18, with which it dips into the pole tube sleeve 56 of the pole tube 42, a snap ring 71, and the pole tube sleeve 56 has a corresponding ring groove 72 at the level of the snap ring 71. In the second embodiment shown in FIG. 3, the connection between the pole tube sleeve 56 and the screw-in component 30 is also made via a flange corresponding to the embodiment shown in FIGS. 1 and 2, so that a positive connection is also produced between screw-in component 30 and pole tube sleeve 56, with the connection enabling a compensatory movement of the pole tube sleeve 56 with respect to the screw-in component 30.

In the embodiment shown in FIG. 3, the sleeve 13 is also held with axial play in the front bore section 33 of the screw-in component 30. Axial play is additionally provided between the pole tube sleeve 56 and the end section of the sleeve 13 dipping into the pole tube sleeve 56. Thus, the sleeve 13 can be pivoted not only perpendicularly to the screw-in component 30 but also perpendicularly to the pole tube sleeve 56, for example, into a position aligned at an incline to the screw-in direction, but owing to the snap ring connection made between the sleeve 13 and the pole tube sleeve 56 it is ensured that the sleeve 13 is secured in axial direction.

Figure 4:
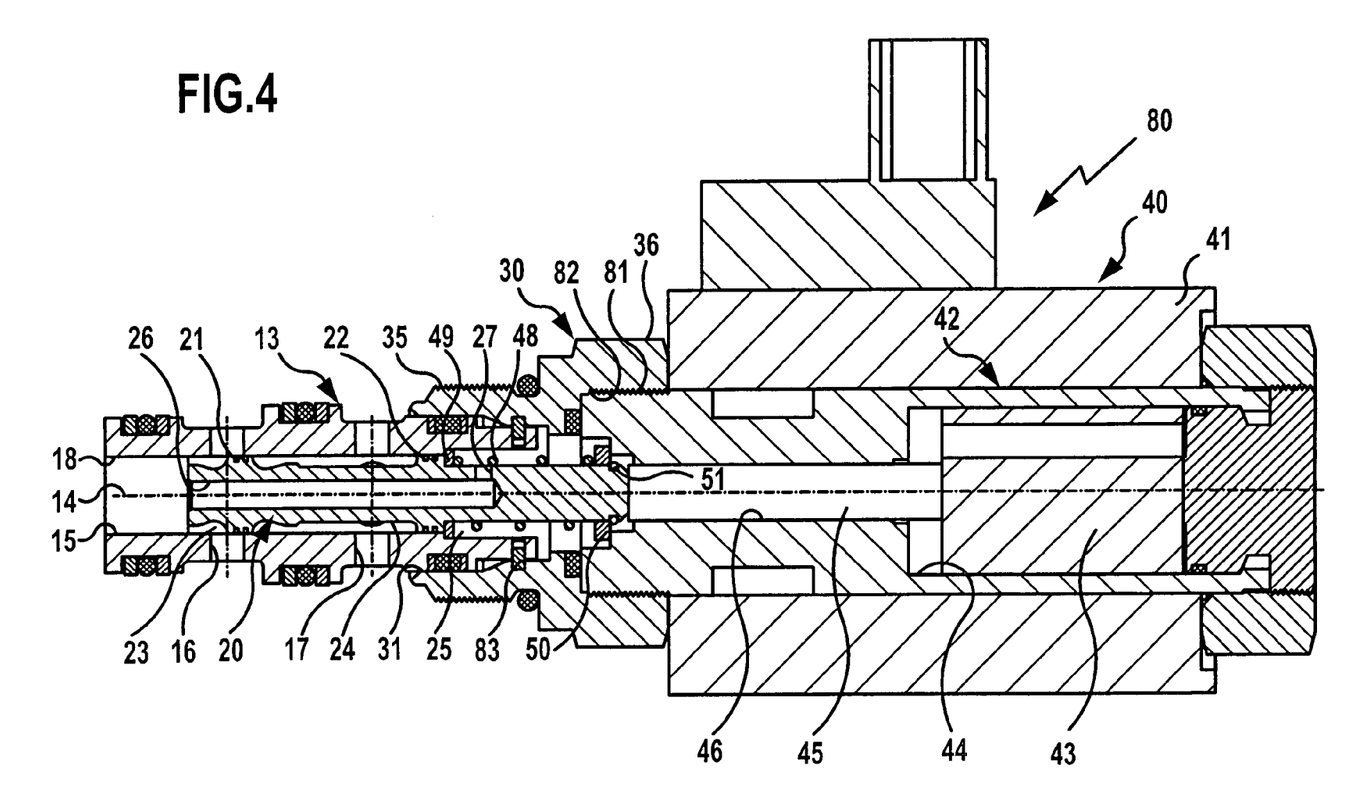
FIG. 4 shows a sectional view of a third embodiment of an inventive screw-in valve.

FIG. 4 shows a third embodiment of the inventive screw-in valve which is generally designated by reference numeral 80. It differs from the above-explained first and second embodiments in that the sleeve 13 is directly positively connected to the screw-in component 30, with the sleeve 13 being able to be displaced and/or pivoted at an incline or perpendicularly to the screw-in direction of the screw-in component 30, while the pole tube 42 is screwed to the screw-in component 30. For this purpose, the pole tube sleeve 56 of the screw-in valve 80 shown in FIG. 4 carries an external thread 81, which interacts with an internal thread 82 of the rear bore section 33 of the screw-in component 30. The sleeve 13 of the screw-in valve 80 dips into the front bore section 32 of the screw-in component 30 and is held in this front bore section 32 with play, with a positive connection being effected between the sleeve 13 and the screw-in component 30 by means of a retaining ring 83. The sleeve 13 is fixed in axial direction by the retaining ring 83, while, at the same time, owing to the radial play of the sleeve 13 in the front end section 32, a compensatory movement of the sleeve 13 is made possible with respect to the screw-in direction of the screw-in component 30, in particular, the sleeve 13 can be displaced in radial direction or aligned at an incline to the screw-in direction.

Figure 5:
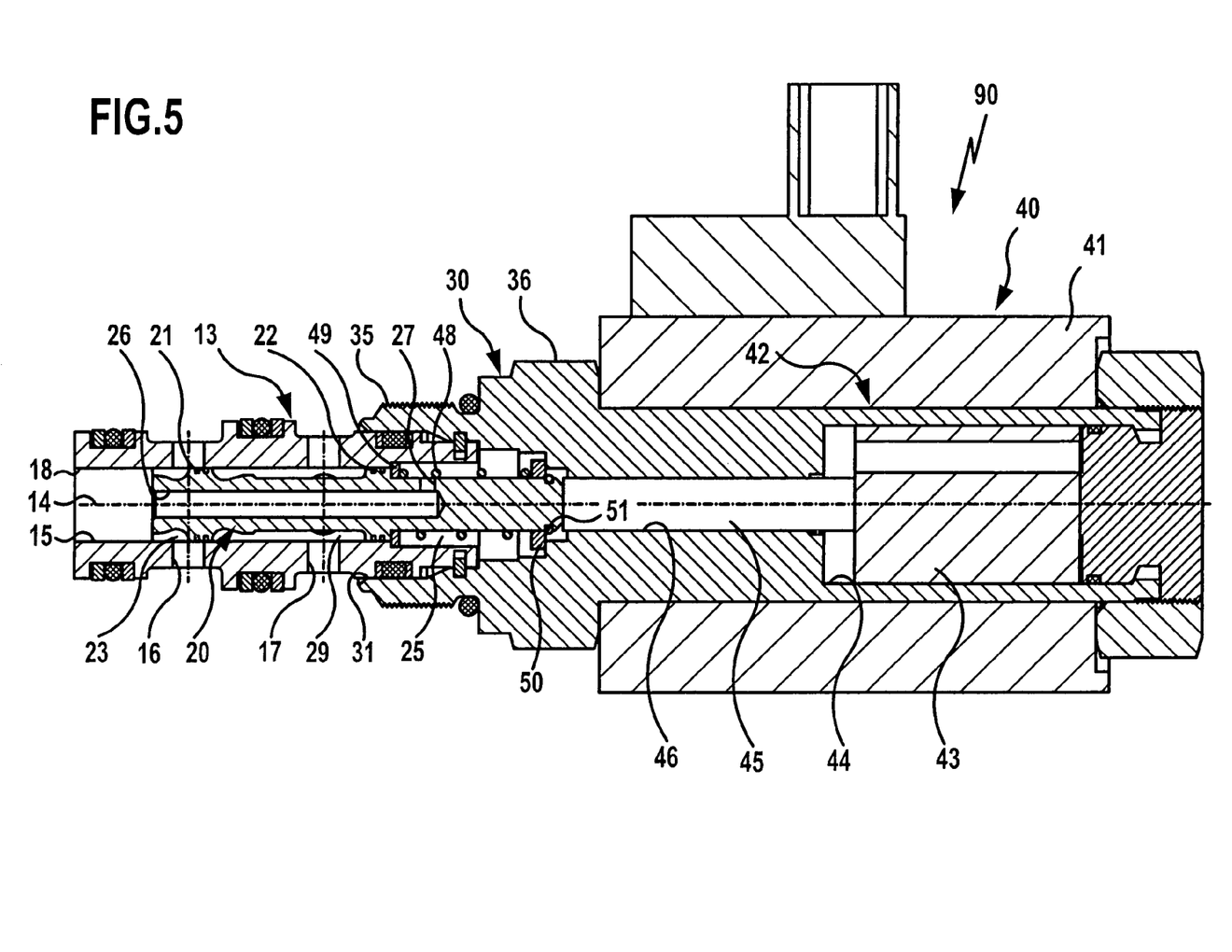
FIG. 5 shows a sectional view of a fourth embodiment of an inventive screw-in valve.

FIG. 5 shows a fourth embodiment of the inventive screw-in valve which is designated by reference numeral 90. This differs from the screw-in valve 80 shown in FIG. 4 in that the screw-in component 30 is integrally connected to the pole tube 42. This makes a particularly time-saving assembly of the screw-in valve possible.

Figure 6:
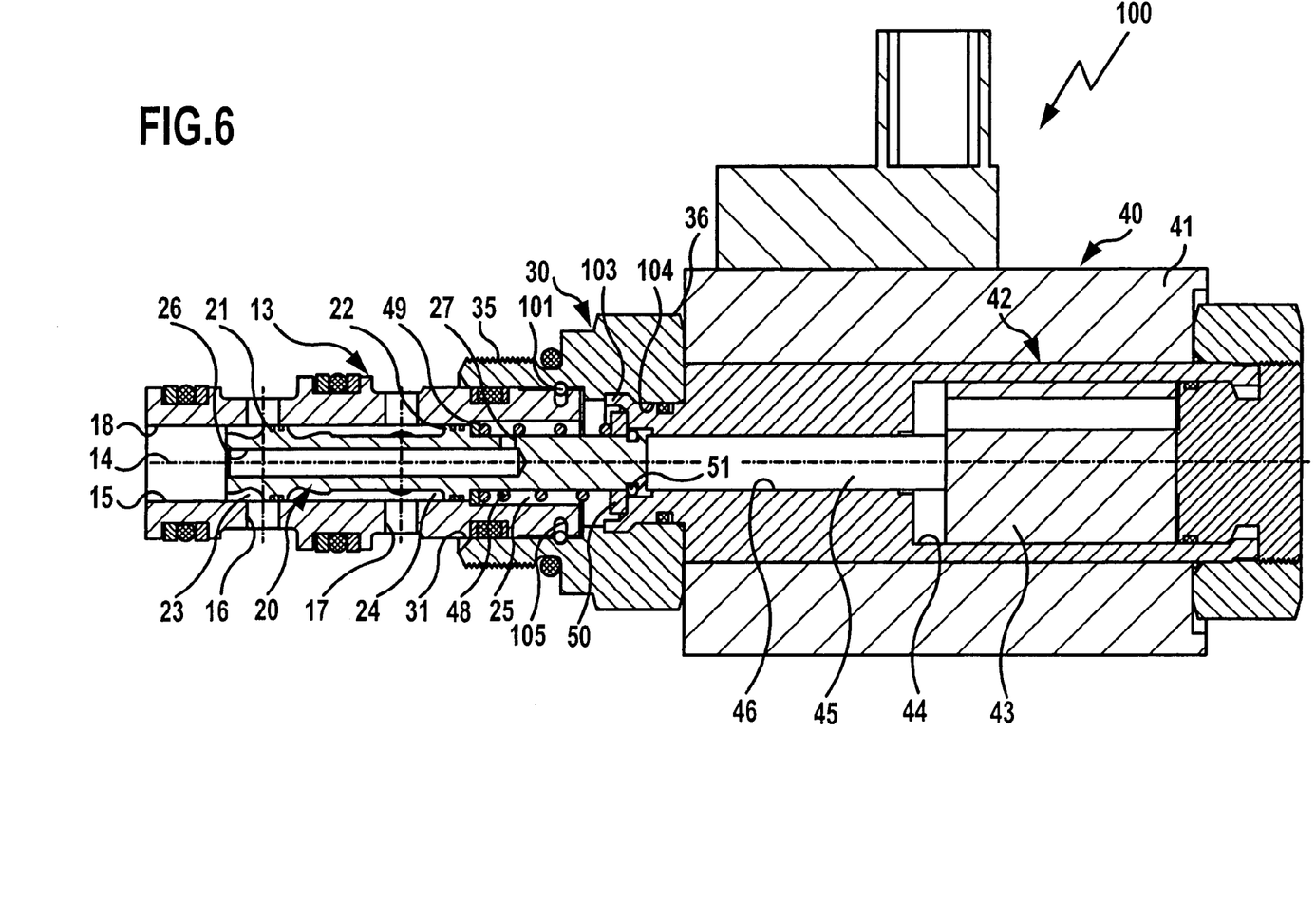
FIG. 6 shows a sectional view of a fifth embodiment of an inventive screw-in valve.

FIG. 6 shows a fifth embodiment in the form of a screw-in valve generally designated by reference numeral 100. It differs from the above-described embodiments in that both the sleeve 13 and the pole tube 42 can be displaced and/or pivoted perpendicularly to the screw-in direction of the screw-in component 30. In accordance with the embodiment of the screw-in valve 80 shown in FIG. 4, the sleeve 13 of the screw-in valve 100 merely dips into the front bore section 32 of the screw-in component 30 and is held therein with radial play. The sleeve 13 is axially fixed on the screw-in component 30 by means of a snap ring 101, which surrounds in circumferential direction the end section of the sleeve 13 dipping into the front bore section 32 and dips into a corresponding ring groove 102 formed in the wall of the front bore section 32 of the screw-in component 30. When assembling the screw-in valve 100, the snap ring 101 is received in the compressed state by a ring groove 105 formed in the sleeve 13. The snap ring connection, while simultaneously ensuring radial play between the sleeve 13 and the front bore section 32, ensures that the sleeve 13 is axially immovable but displaceable and/or pivotable perpendicularly to the screw-in direction of the screw-in component 30.

The connection between the screw-in component 30 and the pole tube 42 in the screw-in valve 100 shown in FIG. 6 is made by means of a flange. For this purpose, the free end of the pole tube sleeve 56 dipping into the rear bore section 33 of the screw-in component 30 is widened in radial direction, so that a widened sleeve section 103 engages behind a rear end section 104 of the rear bore section 33 and, therefore, is axially immovably and positively connected to the screw-in component 30.

Figure 7:
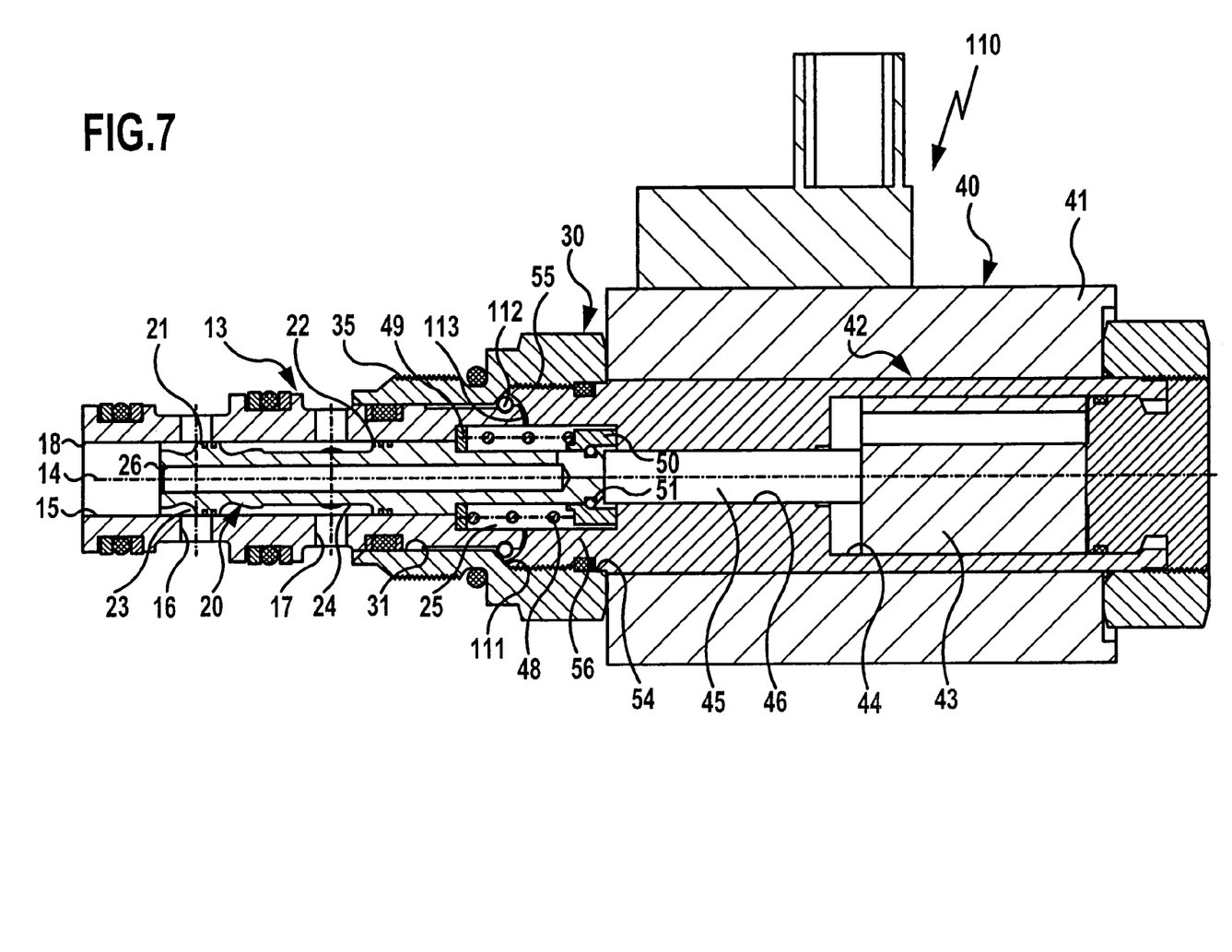
FIG. 7 shows a sectional view of a sixth embodiment of an inventive screw-in valve.

FIG. 7 shows a sixth embodiment of the inventive screw-in valve. This is generally designated by reference numeral 110 and comprises a screw connection between the screw-in component 30 and the pole tube 42 comprising a pole tube sleeve 56 which is screwed via an external thread to the rear bore section 33 of the screw-in component 30.

With the screw-in valve 110, the front bore section 32 does not pass via a radially extending step but via a conical widening 111 into the rear bore section 33. The sleeve 13 passes through the front bore section 32 and projects with its rear end facing away from the first connection opening 18 up to the level of the conical widening 111 and carries in this area a snap ring 112 which bears on the conical widening 111.

The end of the sleeve 13 facing away from the first connection opening 18 is of spherical configuration and projects into a correspondingly designed spherical receptacle 113 of the pole tube sleeve 56, which extends up to the level of the conical widening 111. Since the sleeve 13 is also held with radial play in the front bore section 33 in the sixth embodiment shown in FIG. 7, the sleeve 13 can be displaced and/or pivoted perpendiculary to the screw-in component 30, and, at the same time, it is ensured by use of the snap ring 112 that axial movement of the sleeve 13 relative to the screw-in component 30 is reliably prevented even in the event of alternating pressure load on the sleeve 13 in relation to the longitudinal axis 14.

Figure 8:
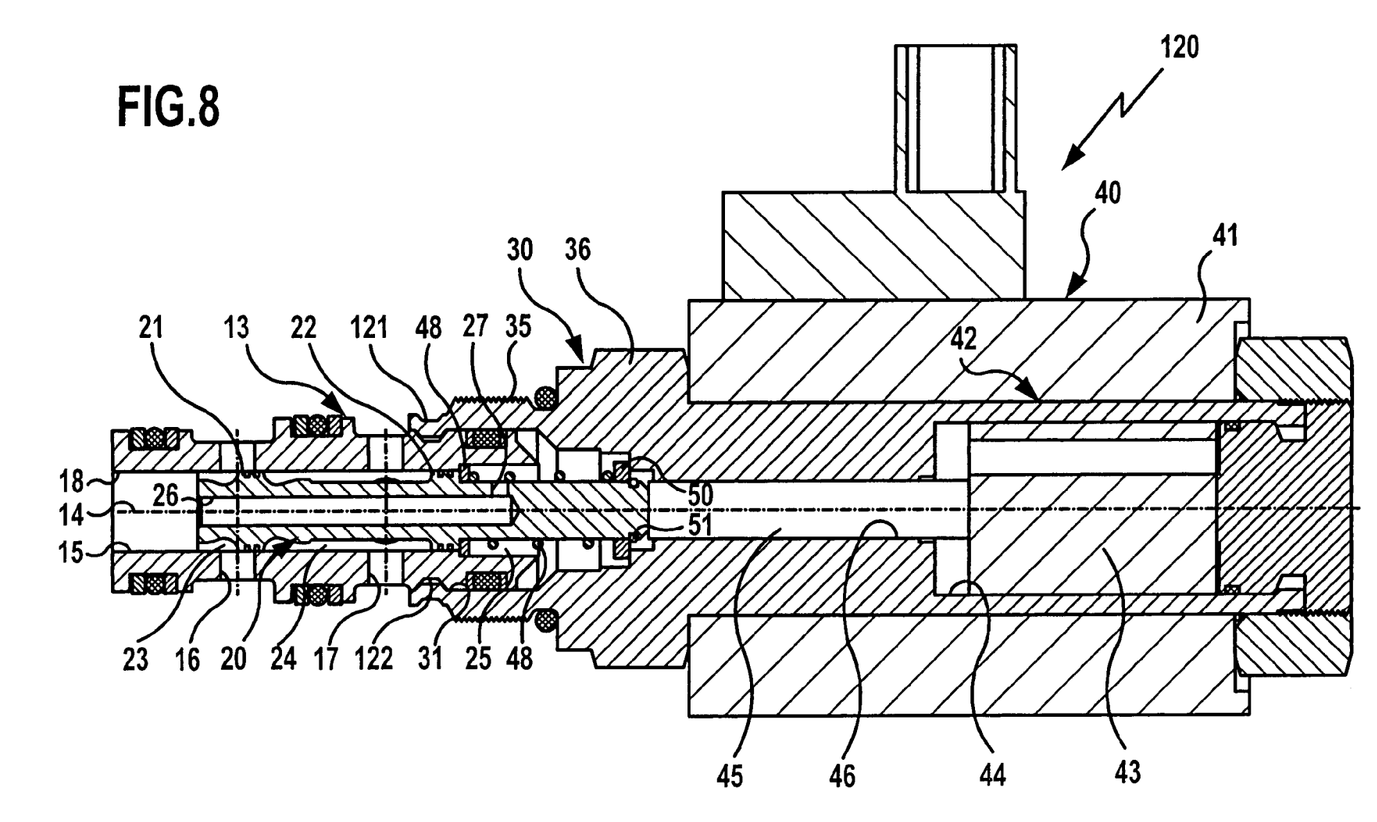
FIG. 8 shows a sectional view of a seventh embodiment of an inventive screw-in valve.

A seventh embodiment of the screw-in valve is shown in FIG. 8 and generally designated by reference numeral 120.

In this embodiment a one-piece connection is likewise provided between the screw-in component 30 and the pole tube 42, and the sleeve 13 is held with radial play in the front bore section 32 of the screw-in component 30. The sleeve 13 of the screw-in valve 120 is positively connected to the screw-in component 30 by means of a flange. For this purpose, the screw-in component 30 comprises in axial direction before the external thread 35 a radially inwardly shaped collar 121 forming a positive connection with a corresponding ring groove 122 formed at the level of the collar 121 in the sleeve 13. By means of the flange it is ensured that the sleeve 13 can be displaced and/or pivoted perpendicularly to the screw-in component 30, and, at the same time, axial movement of the sleeve 13 relative to the screw-in component 30 is reliably prevented.

Figure 9:
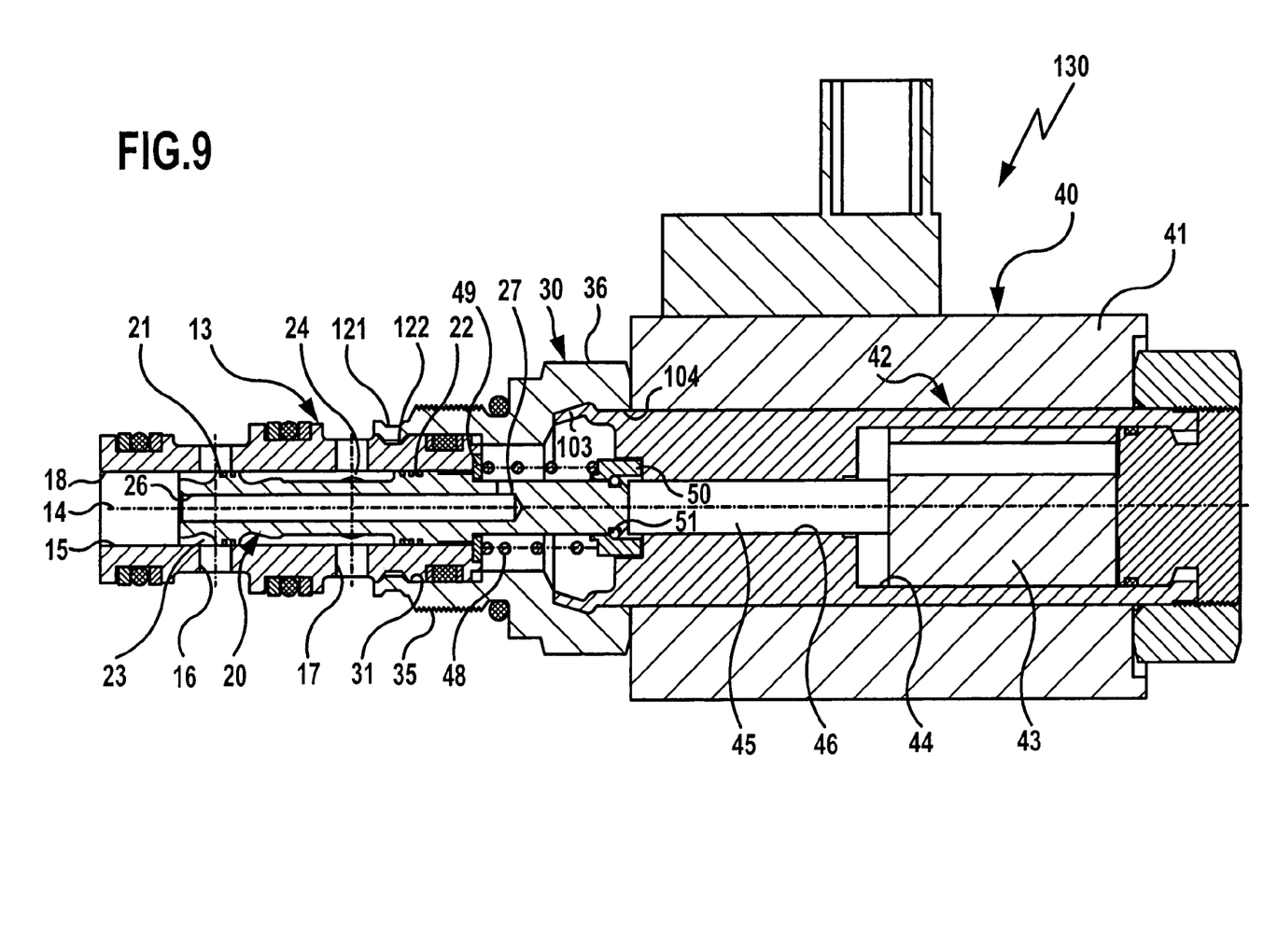
FIG. 9 shows a sectional view of an eighth embodiment of an inventive screw-in valve.

FIG. 9 shows an eighth embodiment of the inventive screw-in valve which is generally designated by reference numeral 130. In accordance with the embodiment of the screw-in valve 120 explained hereinabove with reference to FIG. 8, a flange is also provided between the screw-in component 30 and the sleeve 13 in the screw-in valve 130. For this purpose, the screw-in component 30 of the screw-in valve 130 likewise comprises a collar 121 which is pressed into a corresponding ring groove 122 of the sleeve 13.

Whereas a one-piece connection is used between screw-in component 30 and pole tube 42 in the screw-in valve 120, pole tube 42 and screw-in component 30 are formed separately in the screw-in valve 130 shown in FIG. 9. In the screw-in valve 130 the connection between the pole tube 42 and the screw-in component 30 is made by means of a flange as explained hereinabove with reference to the screw-in valve 100 shown in FIG. 6. Again, the pole tube sleeve 56 comprises a widened sleeve section 103 which engages behind a rear end section 104 of the rear bore section 33 of the screw-in component 30.

By means of the flange connection of both sleeve 13 and pole tube 42 with the screw-in component 30 in the screw-in valve 130 it is ensured that a canting or jamming or any other misalignment of the screw-in component 30 during screwing of the screw-in valve 130 into an associated housing, for example, a control block, results neither in impairment of the movement of the valve piston 20 nor in impairment of the movement of the magnet armature 43 and/or the tappet 45, as the pole tube 42 accommodating the electromagnet 41 can also be displaced and/or pivoted perpendicularly to the screw-in component 30.

Figure 10:
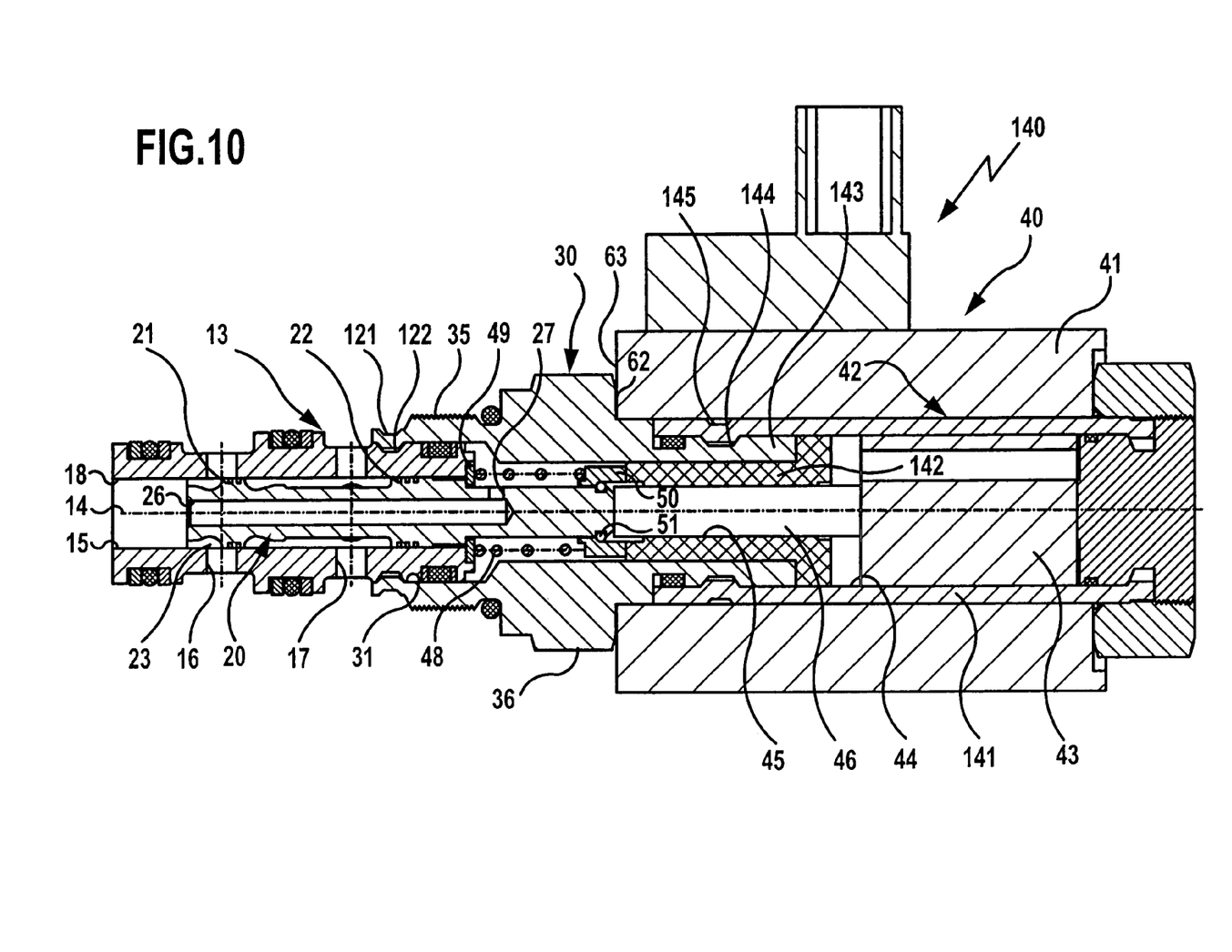
FIG. 10 shows a sectional view of a ninth embodiment of an inventive screw-in valve.

A ninth embodiment of the inventive screw-in valve is shown in FIG. 10 and generally designated by reference numeral 140. This likewise comprises a flange connection between the sleeve 13 and the screw-in component 30, as explained hereinabove with reference to FIGS. 8 and 9. In contrast to the embodiments explained hereinabove, a two-piece pole tube 42 with a pole jacket 141 receiving the electromagnet 41 in circumferential direction and with a pole core 142 is used in the screw-in valve 140. The tappet 45 passes through the pole core 142, which is pressed into a connection sleeve 143, which is integrally connected to the screw-in component 30 and is surrounded in circumferential direction by a front end area of the pole jacket 141 facing the screw-in component 30. A flange connection is provided between the connection sleeve 143 and the pole jacket 141. For this purpose, the connection sleeve 143 comprises on its outer side facing the pole jacket 141 a circumferential ring groove 144 into which a deformation section 145 of the pole jacket 141 is pressed. Since the connection sleeve 143 has radial play in relation to the pole jacket 141, with the exception of the area of the ring groove 144, the pole jacket 141 and the electromagnet 41 held thereon in circumferential direction can be aligned at an incline to the connection sleeve 143 and, therefore, also at an incline to the screw-in component 30. This, in turn, reduces the risk that the electromagnetic actuation of the screw-in valve 130 will be impaired by the screw-in component 30 canting or becoming jammed.

Figure 11:
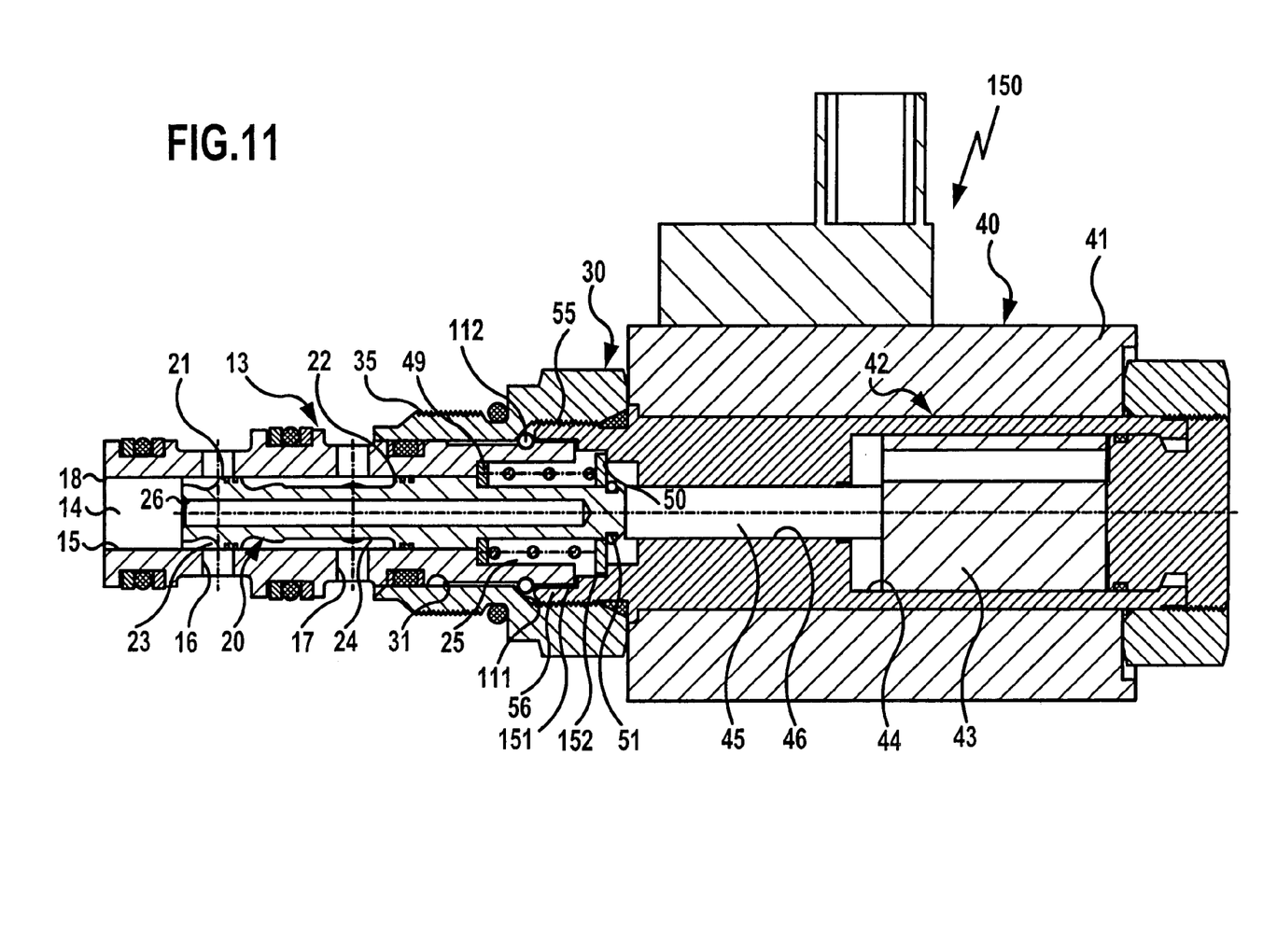
FIG. 11 shows a sectional view of a tenth embodiment of an inventive screw-in valve.

FIG. 11 shows a tenth embodiment of the inventive screw-in valve which is generally designated by reference numeral 150. This is similar in construction to the embodiment shown in FIG. 7. Differently from this, the sleeve 13 in the embodiment shown in FIG. 11 dips into the pole tube sleeve 56, and the receptacle 54 narrows in the direction towards the pole tube 42 via two radially extending steps 151, 152. The sleeve 13 lies with its end area dipping into the pole tube sleeve 56 with play on the front step 151, while the support body 50 is held on the rear step 152. The sleeve 13 is received with radial and axial play by the pole tube sleeve 56.

In the tenth embodiment of the inventive screw-in valve shown in FIG. 11, the screw-in component 30 also comprises a conical widening 111. At the level of this widening 111, in accordance with the sixth embodiment shown in FIG. 7, the sleeve 13 is surrounded by a snap ring 112 which, however, is only loaded with an axial force in the event of an axial pressure loading of the sleeve 13 oriented in the direction facing away from the screw-in component 30, whereas in the event of an axial pressure loading of the sleeve 13 in the direction of the screw-in component 30, i.e., to the right in FIG. 11, the snap ring 112 is not subjected to any axial loading, but the sleeve 13 is supported on the front step 151 of the pole tube sleeve 56. Consequently, by use of the snap ring 112 in combination with the front step 151, the sleeve 13 is held immovably in axial direction, while a radial displacement or pivoting movement is ensured by the play provided between the sleeve 13 and the pole tube sleeve 56 and the screw-in component 30. This play can also be referred to as compensatory manufacturing dimension.

Figure 12:
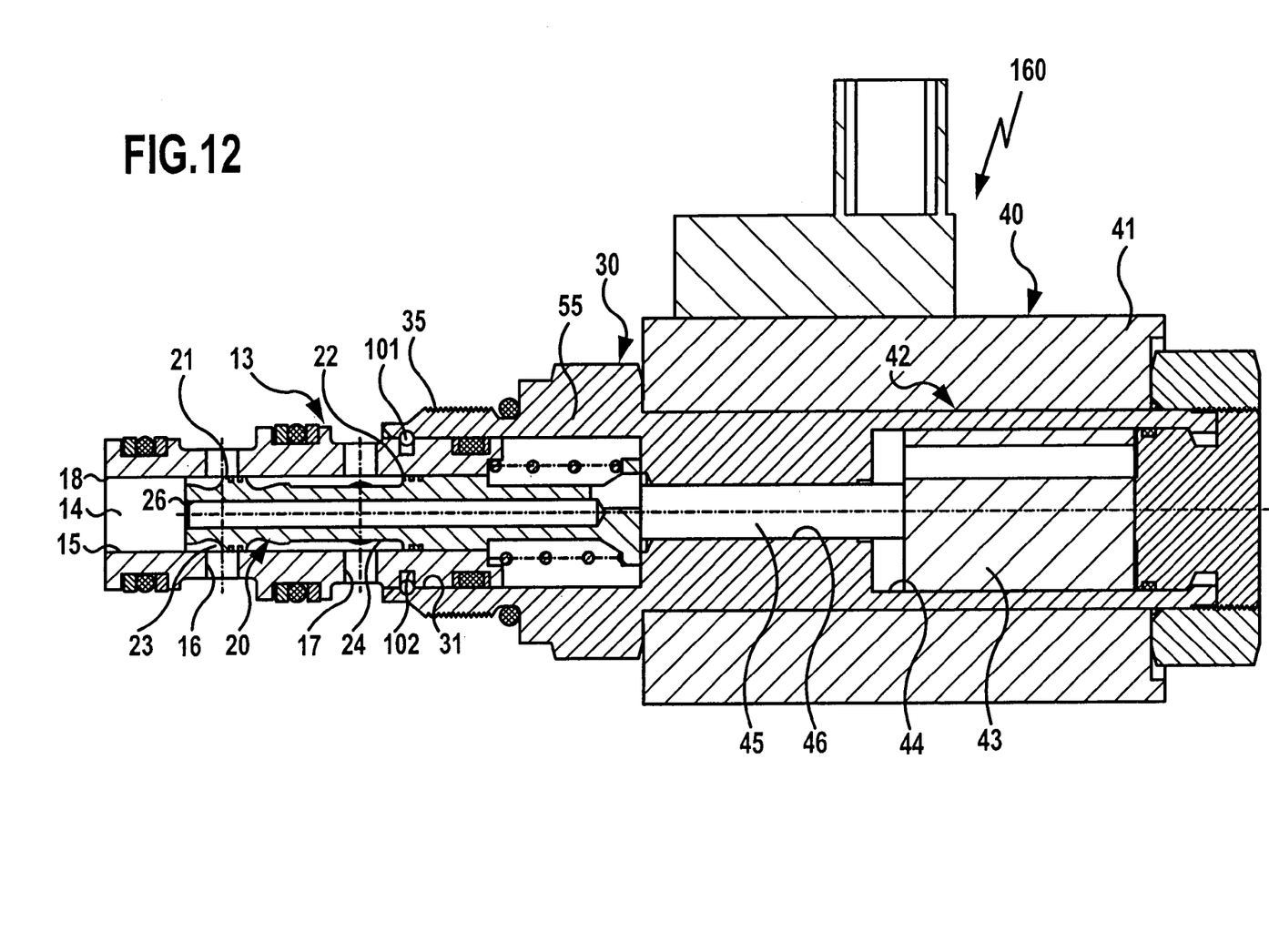
FIG. 12 shows a sectional view of an eleventh embodiment of an inventive screw-in valve.

Whereas in FIG. 11 the screw-in component 30 is connected to the pole tube 42 via a thread, in the eleventh embodiment of the inventive screw-in valve shown in FIG. 12 a one-piece connection is provided between screw-in component 30 and pole tube 42. The screw-in valve shown in FIG. 12 is generally designated by reference numeral 160. In this embodiment, the sleeve 13 is axially fixed on the screw-in component 30, in accordance with the construction of the fifth embodiment shown in FIG. 6, by means of a snap ring 101, which is received by a ring groove 102 formed in the sleeve 13 when assembling the screw-in valve 160. The snap ring 101 is arranged in the area of the front end of the screw-in component 30 facing away from the pole tube 42, and the outer diameter of the sleeve 13 is slightly reduced at a slight axial spacing from the snap ring 101 and from the ring groove 102 receiving it, so that the sleeve 13 is received with radial play by the through-bore 31 of the screw-in component 30. This makes it possible to pivot the sleeve 13 in radial direction, in order to correct any misalignment of the screw-in component 30 when screwing it into a housing receiving the screw-in valve 160.

What is claimed is:

1. Screw-in valve comprising:
   a screw-in component,
   a sleeve with at least two connection openings to which a pressure load can be alternately applied,
   a valve piston held for axial displacement in said sleeve for opening and closing a flow connection between said connection openings, said sleeve being mounted so as to be axially immovable, and means to allow said sleeve to be displaceable and/or pivotable perpendicularly to a screw-in direction of the screw-in component relative to the screw-in component.

2. Screw-in valve in accordance with claim 1, wherein the sleeve is connected to the screw-in component by at least one positive connection.

3. Screw-in valve in accordance with claim 1, wherein the sleeve is directly positively connected to the screw-in component.

4. Screw-in valve in accordance with claim 3, wherein the sleeve is positively connected to the screw-in component by means of a flange.

5. Screw-in valve in accordance with claim 3, wherein the sleeve is connected to the screw-in component by means of a retaining ring or snap ring connection.

6. Screw-in valve in accordance with claim 5, wherein the screw-in component forms a receptacle in which an end section of the sleeve is held with play by means of a retaining ring or a snap ring.

7. Screw-in valve in accordance with claim 1, wherein the sleeve is connected to the screw-in component by at least one intermediate component.

8. Screw-in valve in accordance with claim 7, wherein the sleeve is fixed on the intermediate component, and the intermediate component is positively connected to the screw-in component and is axially immovable but displaceable and/or pivotable perpendicularly to the screw-in direction of the screw-in component relative to the screw-in component.

9. Screw-in valve in accordance with claim 8, wherein the sleeve is screwed to the intermediate component.

10. Screw-in valve in accordance with claim 8, wherein the intermediate component is connected to the screw-in component by means of a flange.

11. Screw-in valve in accordance with claim 7, wherein the sleeve is releasably connectable to the intermediate component, and the screw-in component forms a stop on which the intermediate component is axially immovably held.

12. Screw-in valve in accordance with claim 7, wherein the sleeve is held on the intermediate component so as to be axially immovable but displaceable and/or pivotable perpendicularly to the screw-in direction of the screw-in component, and the intermediate component is held on the screw-in component so as to be axially immovable but displaceable and/or pivotable perpendicularly to the screw-in direction of the screw-in component.

13. Screw-in valve in accordance with claim 7, wherein the intermediate component comprises an axial bore in which an end area of the sleeve is held with radial play by means of a snap ring or a retaining ring.

14. Screw-in valve in accordance with claim 7, wherein the screw-in valve comprises an electromagnetic actuating unit with an electromagnet which surrounds a pole tube, and the pole tube forms the intermediate component which is connected to the sleeve.

15. Screw-in valve in accordance with claim 1, wherein the screw-in valve comprises an electromagnetic actuating unit with a pole tube on which an electromagnet is held, and the pole tube is mounted so as to be axially immovable but displaceable and/or pivotable perpendicularly to the screw-in direction of the screw-in component relative to the screw-in component.

* * * * *

UNITED STATES PATENT AND TRADEMARK OFFICE
CERTIFICATE OF CORRECTION

PATENT NO. : 7,000,891 B2
DATED : February 21, 2006
INVENTOR(S) : Rocca et al.

It is certified that error appears in the above-identified patent and that said Letters Patent is hereby corrected as shown below:

<u>Title page,</u>
Item [73], Assignee, should read -- FSP Fluid Systems Partners Holding AG --.

Signed and Sealed this

Twenty-fifth Day of April, 2006

JON W. DUDAS
*Director of the United States Patent and Trademark Office*